United States Patent [19]

Isogai

[11] Patent Number: 5,031,476
[45] Date of Patent: Jul. 16, 1991

[54] LEVER LOCKING MECHANISM

[75] Inventor: Shunji Isogai, Hekinan, Japan

[73] Assignee: Sugiyasu Industries Co., Ltd., Takahama, Japan

[21] Appl. No.: 476,888

[22] Filed: Feb. 8, 1990

[30] Foreign Application Priority Data

Jul. 11, 1989 [JP] Japan .................. 1-81316[U]

[51] Int. Cl.⁵ ............................................. G05G 5/06
[52] U.S. Cl. .................................................... 74/536
[58] Field of Search ............ 74/526, 523, 519, 535, 74/529, 536, 533

[56] References Cited

U.S. PATENT DOCUMENTS

| | | | |
|---|---|---|---|
| 1,103,151 | 7/1914 | Morris | 74/526 |
| 1,182,707 | 5/1916 | Quade, Jr. | 74/536 |
| 1,543,422 | 6/1925 | Coultas | 74/536 |
| 1,898,869 | 2/1933 | Dadd | 74/536 X |
| 1,998,972 | 4/1935 | Snell | 74/536 |
| 2,097,328 | 10/1937 | Jandus | 74/536 |
| 2,158,263 | 5/1939 | Wenn | 74/536 |
| 2,328,720 | 9/1943 | House | 74/536 |
| 4,923,357 | 5/1990 | Isogai | 414/495 |

Primary Examiner—Rodney M. Lindsey
Attorney, Agent, or Firm—Lahive & Cockfield

[57] ABSTRACT

A mechanism is disclosed which automatically locks and unlocks a lever including (i) a link connected pivotally to an fixed object and having opposed plates and (ii) a rod with a lower portion located between the opposed plates and with a lower end pivotally connected to the link. The locking mechanism comprises two stopper means fixed between the opposed plates and so located as to allow the rod to make a pivotal movement for a predetermined angle relative to the link, a hook connected pivotally to the link, a lock pin projecting from the fixed object and so located as to engage with the hook to lock the lever when the lever is located in a position predetermined relative to the fixed object, means for urging the hook toward the lower end of the rod, and an unlock pin projecting from the hook and so located as to engage with the rod to disengage the hook from the lock pin against the action of the urging means, when the rod is turned toward one of the stopper means, thereby unlocking the lever.

1 Claim, 5 Drawing Sheets 5,031,476

LEVER LOCKING MECHANISM

FIELD OF THE INVENTION

This invention relates to a lever locking mechanism, especially adapted to be used for a container transfer lift.

BACKGROUND OF THE INVENTION

When a container is to be transferred from a transfer lift onto a truck, a transfer plate of the lift must be erected and maintained in the erected position, for safety, before the container is moved onto the lift. A lever is usually provided to erect and bring down the transfer plate from a remote point. The lever must be locked to lock the transfer plate in the erected position. Usually, therefore, a mechanism is provided to lock the lever. However, the conventional lever locking mechanism has been an independent mechanism which itself must be manually operated to lock and unlock the lever.

SUMMARY OF THE INVENTION

Accordingly, it is the primary object of the invention to provide a lever locking mechanism, especially adapted to be used for a container transfer lift, which itself need not be operated to lock and unlock a lever. In other words, the primary object of the invention is to provide a mechanism for automatically locking and unlocking a lever.

According to the invention, a lever is automatically locked and unlocked when the lever is operated to erect and bring down a transfer plate.

According to the invention, a mechanism for automatically locking and unlocking a lever, especially adapted to be used for a container transfer lift, the lever comprising (i) a link connected pivotally to an fixed object and having opposed plates and (ii) a rod with a lower portion located between the opposed plates and with a lower end pivotally connected to the link, is provided which comprises two stopper means fixed between the opposed plates and so located as to allow the rod to make a pivotal movement for a predetermined angle relative to the link, a hook connected pivotally to the link, a lock pin projecting from the fixed object and so located as to engage with the hook to lock the lever when the lever is located in a position predetermined relative to the fixed object, means for urging the hook toward the lower end of the rod, and an unlock pin projecting from the hook and so located as to engage with the rod to disengage the hook from the lock pin against the action of the urging means, when the rod is turned toward one of the stopper means, thereby unlocking the lever.

DETAILED DESCRIPTION OF PREFERRED EMBODIMENTS

The invention will now be described in detail with reference to a lever locking mechanism used for a container transfer lift.

Figure 1:
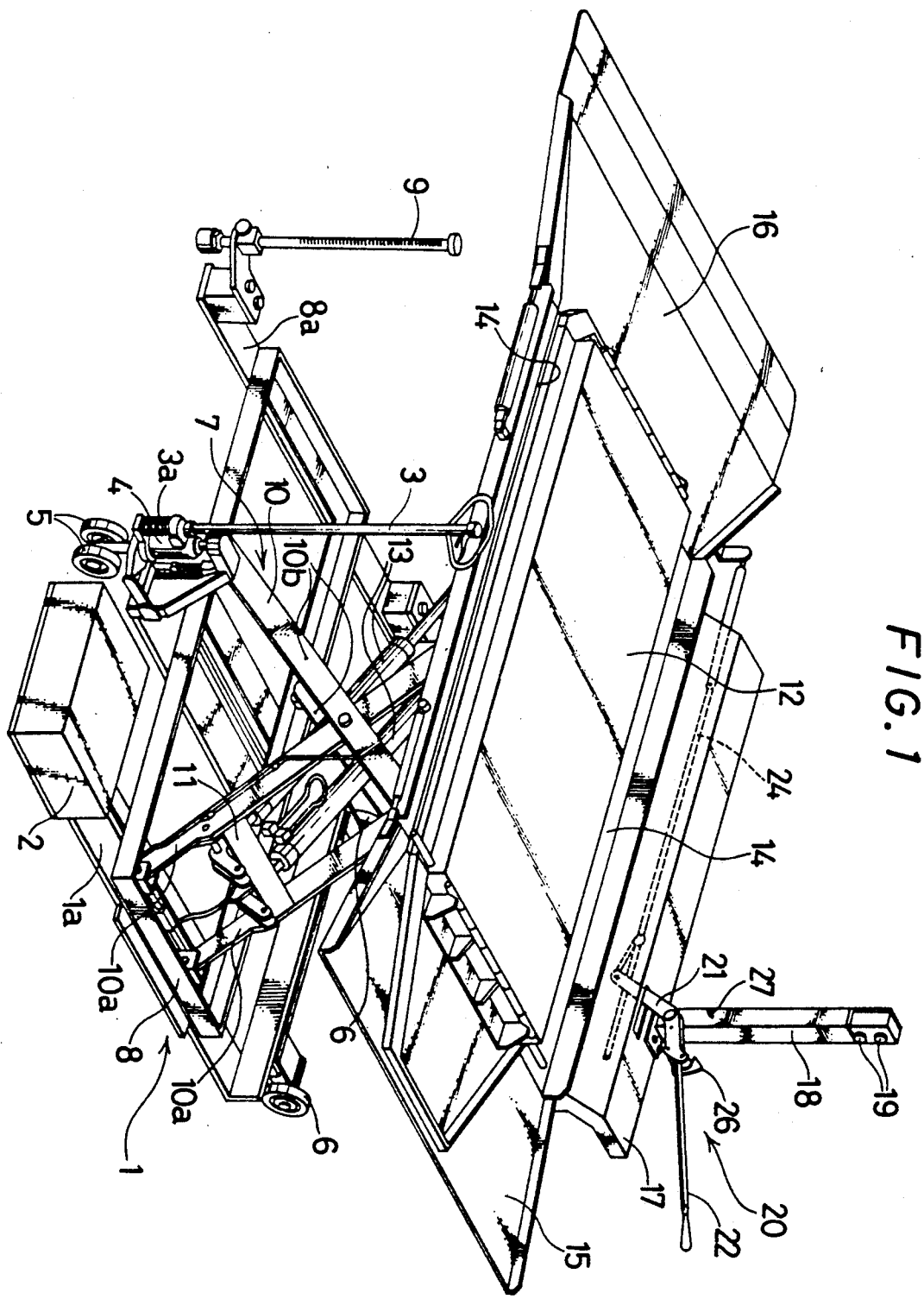
FIG. 1 is a perspective view of a container transfer lift with a lever locking mechanism of the invention.

In FIG. 1 a container transfer lift includes a vehicle means 1 having a base, or frame 1a. A hydraulic unit 2 is provided at one side of the base 1a. An operating means is also provided at the same side thereof. The operating means comprises a pumping handle 3, a pump 3a and a cylinder 4. Steering wheels 5 are provided in conjunction with the pumping handle 3. Also, wheels 6 are provided at the side opposite to the operating means. Only one of the wheels 6 are illustrated in FIG. 1. The pumping handle 3, the pump 3a, the cylinder 4 and the steering wheels 5 are connected together such that they are turned as one body in a horizontal plane by rotating the pumping handle 3. Also, the pumping handle 3 can be inclined to supply oil into the cylinder 4 thorough the pump 3a. When the oil is supplied into the cylinder 4, the base 1a is lifted away from the floor by the wheels 5 and 6. When the base 1a is in a lifted position, the entire lift can be smoothly moved on the floor.

A lifting construction 7 is located on the vehicle means 1. The lifting construction 7 includes a frame 8 which are at right angles to the base 1a. The frame 8 has a portion projecting from the base 1a to one side thereof. An arm 8a is fixed to the bottom of the end of the projecting portion of the frame 8. Support rods 9 are supported by brackets located on opposed end portions of the arm 8a, respectively. Two opposed pairs of pivotally connected links 10a and 10b are located on the frame 8. The links 10a and 10b are connected in the shape of the letter X. The lower end of the link 10a is pivotally connected to the frame 8, while the lower end of the link 10b is slidable on the frame 8. The two links 10a are connected by a connecting member 11. The links 10a and 10b constitute a jack means which can be expanded upward and folded downward. A table 12 is supported on the lifting construction 7. A pair of cylinders 13 are provided. One end of each cylinder 13 is pivotally connected to the connecting member 11. A piston rod disposed in the cylinder 12 is pivotally connected to the bottom of the table 12.

The cylinder 13 is operated by the hydraulic unit 2 to raise or lower the table 12. A pair of grooves 14 are provided on opposed sides of the table 12, respectively. A stepping plate 15 is connected to the front end of the table 12. A transfer plate 16 is connected to the rear end of the table 12. Each plate can be turned between a horizontal position and a substantially vertical position.

Figure 3:
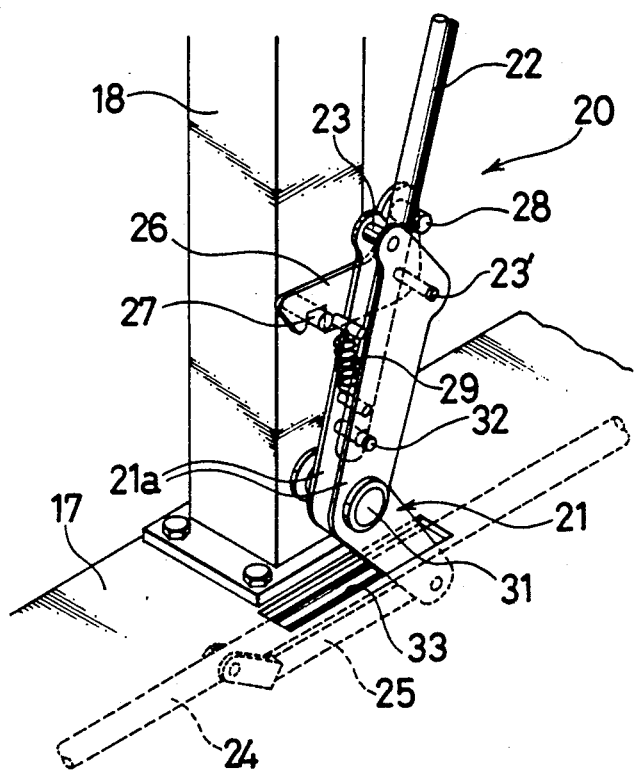
FIG. 3 shows the lever locking mechanism.
Figure 4:
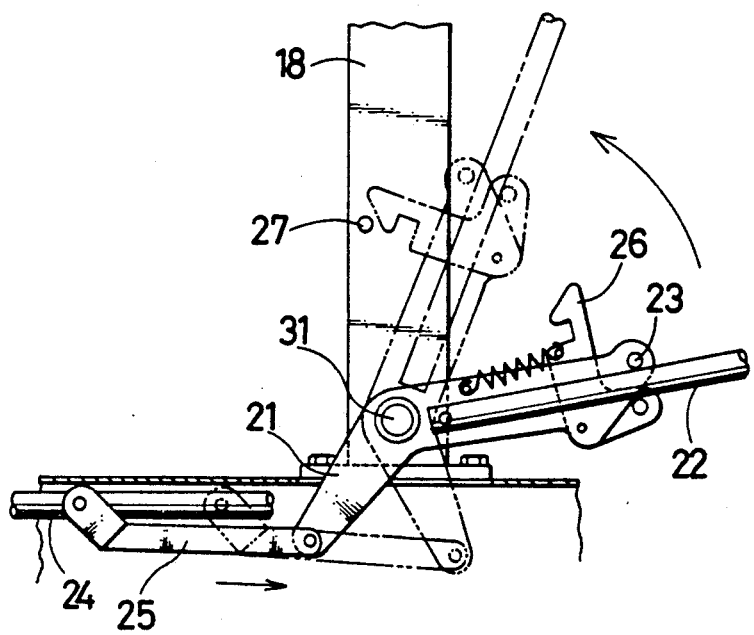
FIGS. 4(a), 4(b), and 4(c) illustrate how the lever locking mechanism works.
Figure 4:
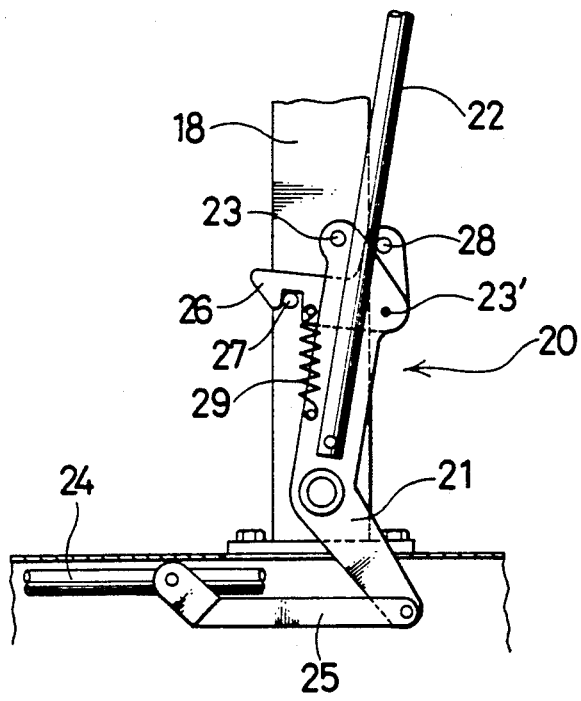
Figure 4:
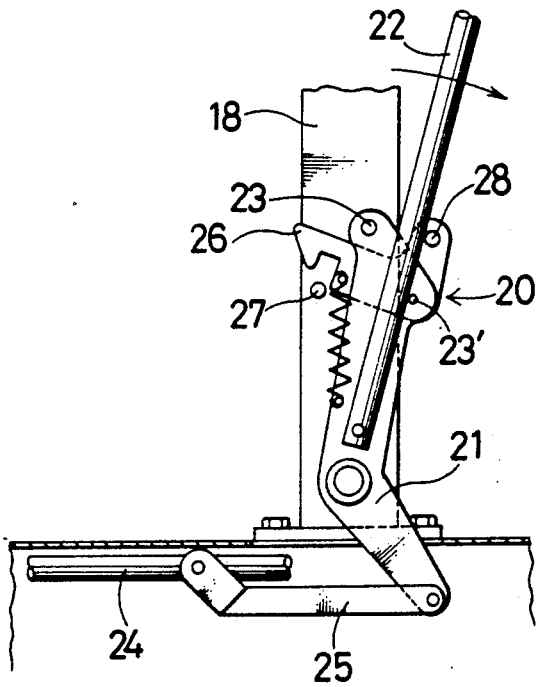

An elongate plate 17 is fixed to one side of the table 12. An operator can stand on the plate 17. The plate 17 is provided with a column 18. The column 18 is provided with push buttons 19 which can be operated to actuate the lift construction 7. The column 17 is also provided with a lever 20 which can be turned in a vertical plane to rotate the transfer plate 16 between a horizontal position and a substantially vertical position. The lever 20 is best shown in FIG. 3. The lever 20 is connected to the lower portion of the column 18 by a pivot pin 31. The lever 20 includes a link 21 and a rod 22. The link 21 comprises two parallel angular plates 21a through which the pivot pin 31 extends. The angular plates 21a have lower end portions projecting downward from an opening 33 of the plate 17. The rod 22 has a lower portion located between the angular plates 21a, and has a lower end pivotally supported on a pin 32 extending through the plates 21a. Reference numeral 23 designates a stopper pin with opposed ends disposed in openings of the angular plates 21a. Another stopper pin 23, is spaced apart from the stopper pin 23. The stopper pin 23, also has opposed ends disposed in openings of the angular plates 21a. The pivotal movement (on the pin 32) of the rod 22 relative to the link 21 is stopped when the rod 22 has engaged with the stopper pin 23 or 23'. The stopper pins 23 and 23' are so located that the rod 22 can be turned for substantially 10 degrees relative to the link 21. However, the rod 22 can be turned clockwise while the rod 22 is in engagement with the stopper pin 23', thereby turning the link 21 in the same direction. The whole lever 20 can thus be turned clockwise. Also, the rod 22 can be turned counterclockwise while the rod 22 is in engagement with the stopper pin 23, thereby turning the link 21 in the same direction. The whole lever 20 can thus be turned counterclockwise. The lever 20 can be turned between a substantially horizontal position (FIG. 4(a)) and a substantially vertical position (FIG. 4(b)).

Reference numeral 24 designates a horizontal interlock rod with a greater part extending in the plate 17 and with one end portion projecting from the plate 17 and connected to the transfer plate 16. A horizontal link 25 is fixed to the interlock rod 24 at one end thereof. The lower end of the angular link 21 is pivotally connected to the opposed end of the horizontal link 25. Thus, when the lever 20 is turned clockwise (as viewed from the side of the table 12), the interlock rod 24 is moved to the left to turn the transfer plate 16 to a horizontal position. When the lever 20 is turned counterclockwise, the interlock rod 24 is moved to the right to turn the transfer plate to a substantially vertical position.

A hook 26 is pivotally connected to one side of one of the angular plates 21a. Reference numeral 27 designates a lock pin projecting from the column 18. When the lever 20 is in the substantially vertical position, the hook 26 is in engagement with the lock pin 27 and, hence, the lever 22 is locked in the same position. The hook 26 is urged toward the lower end portion of the rod 22 by means of a spring 29. Reference numeral 28 designates an unlock pin projecting from one side of the hook 26. The unlock pin 28 is so located that the rod 22 engages with the unlock pin 28 when the rod 22 is turned clockwise from the substantially vertical position. The rod 22 engages with the unlock pin 28 before engaging with the stopper pin 23'. By engaging with the unlock pin 28, the rod 22 causes the hook 26 to make a clockwise pivotal movement against the action of the spring 29 to disengage from the lock pin 27. Then, the rod 22 engages with the stopper pin 23', and thence the rod 22 is turned while in engagement with both the unlock pin 28 and the stopper pin 23'(FIG. 4(c)).

Figure 2:
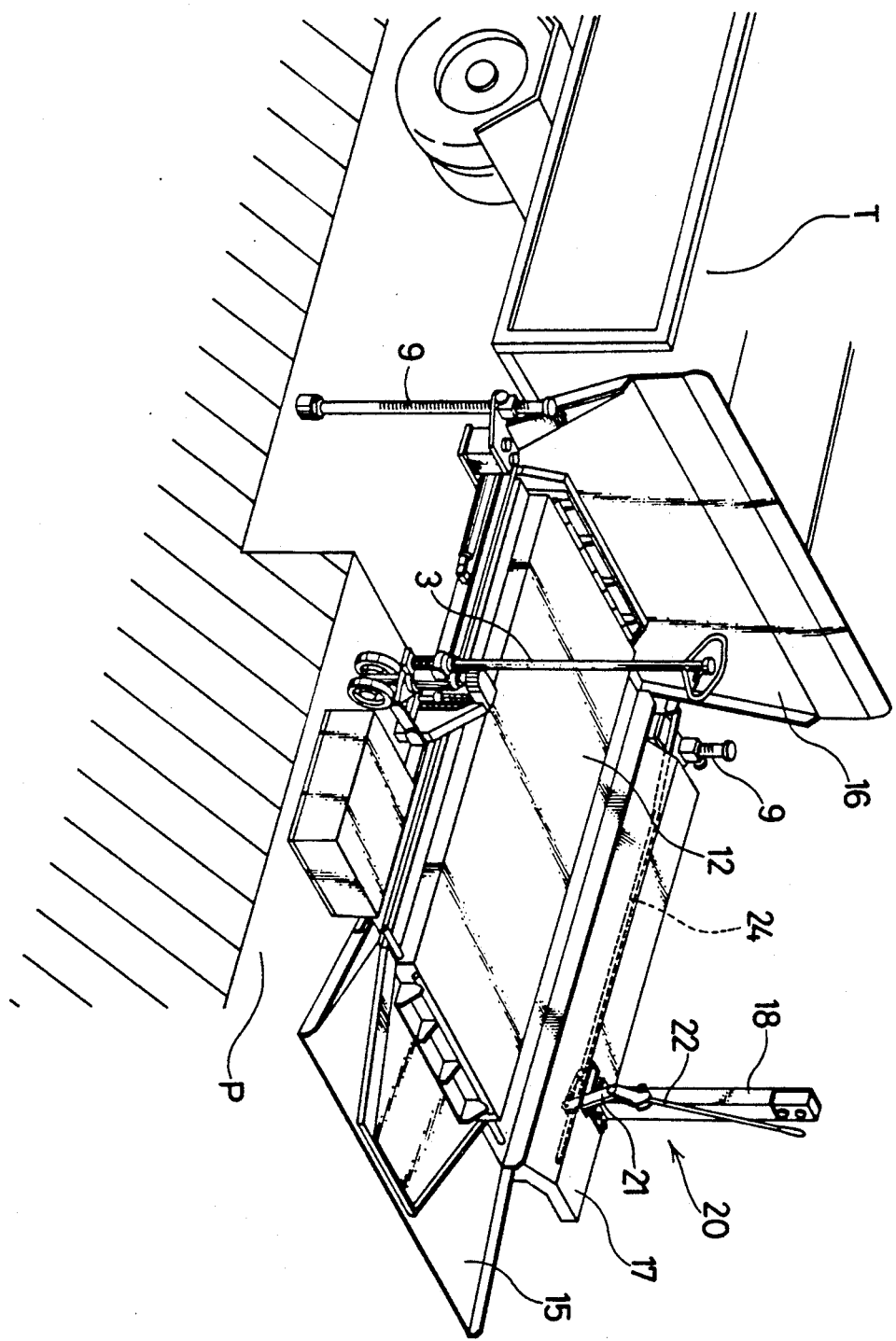
In FIG. 2 a transfer plate of the lift of FIG. 1 is locked in an erected position.
Figure 5A:
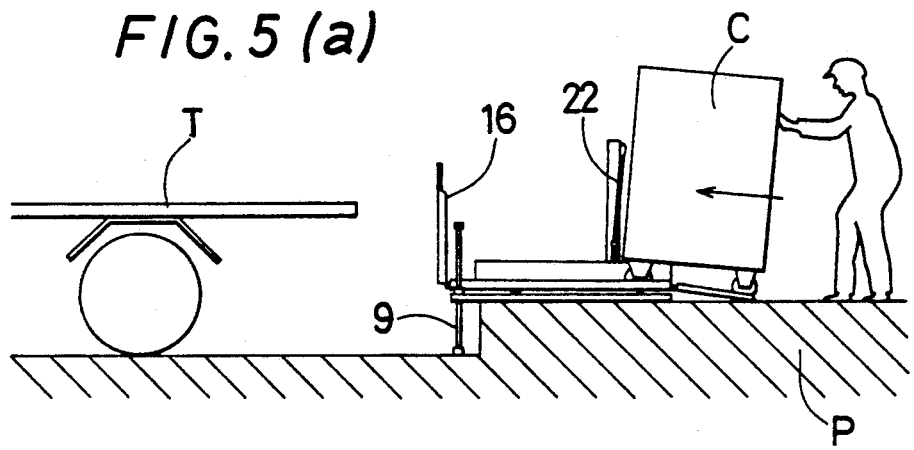
FIG. 5(a) and 5(b) illustrate how a container is transferred onto a truck.

In FIG. 2 the letter T designates a truck located on a ground level. In use, the base 1a of the container transfer lift is raised away from a platform P, and the lift is moved to such a position on a platform P where, for example, the stepping plate 16 and a portion of the table 12 project from the platform P. Then, the base 1a is lowered on the platform P. Then, the table 12 is moved to its lowest position. Then, the lever 20 is turned counterclockwise (as viewed from the side of the table 12) from a substantially horizontal position (FIG. 4(a)). The interlock rod 24 thus moves to the right to turn the transfer plate 16 to a substantially vertical position. When the lever 20 reaches a substantially vertical position, the hook 26 engages with the lock pin 27 (FIG. 4(b)). Thus, the lever 20 is locked in the substantially vertical position and, hence, the transfer plate 16 is also locked in the erected position. Then, a container C is moved onto the table 12 (FIG. 5(a)). The container C is moved until it comes to a position immediately in front of the erected transfer plate 16. If the container C is accidentally moved into contact with the transfer plate 16, however, there is no possibility that the transfer plate 16 may be brought down since the engagement of the hook 26 and the lock pin 27 does not allow the interlock rod 24 to move to the left.

Figure 5B:
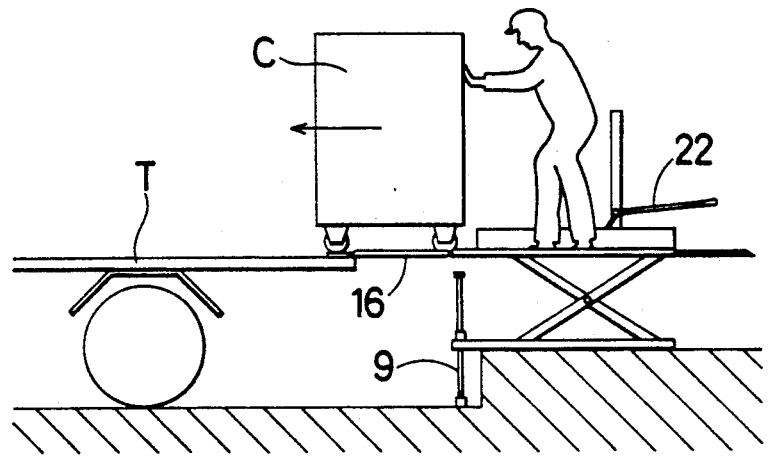

Then, the table 12 is raised to a required height. Then, the lever 20 is turned counterclockwise (FIG. 4(c)). Thus, the rod 22 engages with the unlock pin 28 to disengage the hook 26 from the lock pin 27. The lever 20 is thus unlocked. Then, the rod 22 engages with the stopper pin 23' (without disengaging from the unlock pin 28), and the whole lever 20 is returned to the substantially horizontal position. The interlock rod 24 is thus moved to the left to bring down the transfer plate to the horizontal position. The distal end portion of the transfer plate 16 is thus positioned on the bed of the truck T (FIG. 5(b)). Then, the container C is transferred onto the bed of the truck T (FIG. 5(b).

Figure 6:
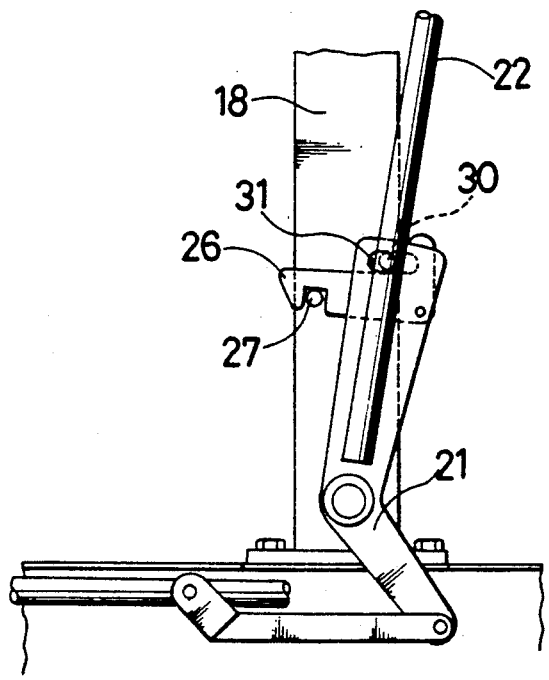
FIG. 6 shows a modification of the lever locking mechanism.

If desired, the stopper pins 23 and 23' may be replaced with a corresponding mechanism of FIG. 6. That is, in FIG. 6, the rod 22 is provided with a pin 30, and the link 21 is provided with an opening 31 into which the pin 30 is received. The opening 31 may have such a size that the rod 22 can be turned for substantially the same angle relative to the link 21 as in the first embodiment.

In the embodiment described, the link 21 is pivotally connected to a vertical surface (of the column 18). It will be appreciated, however, that the link 21 may also be pivotally connected to a horizontal surface.

What is claimed is:

1. A mechanism for automatically locking and, alternatively, unlocking a transfer plate on a container transfer lift by means of a lever, wherein the lever includes (i) a link connected pivotally to a fixed object and having opposed plates and (ii) a rod with a lower portion located between the opposed plates and with a lower end pivotally connected to the link, said mechanism comprising
    (a) two stopper means fixed between the opposed plates and adapted to allow the rod to make a pivotal movement for a predetermined angle relative to the link,
    (b) a hook connected pivotally to the link,
    (c) a lock pin projecting from the fixed object and so located as to engage said hook to lock the lever when the lever achieves a predetermined position relative to the fixed object,
    (d) means for urging said hook toward the lower end of the rod, and
    (e) an unlock pin projecting from said hook,
    wherein said unlock pin is adapted to engage the rod and to disengage said hook from said lock pin, against the action of the urging means, when the rod pivots through said predetermined angle from a substantially vertical position to a substantially horizontal position to engage one of said stopper means, thereby automatically unlocking the lever and the transfer plate, and
    alternatively, wherein said rod is pivoted from a substantially horizontal position through said predetermined angle to engage the other of said stopper means, thereby engaging said hook with said lock pin and automatically locking said lever and said transfer plate in a substantially vertical position.

* * * * *